(12) United States Patent
Ishii

(10) Patent No.: US 6,805,901 B2
(45) Date of Patent: Oct. 19, 2004

(54) MAGNETIC DOMAIN WALL DISPLACEMENT TYPE MAGNETO-OPTICAL MEDIUM AND METHOD FOR MANUFACTURING THE SAME

(75) Inventor: Kazuyoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/793,573

(22) Filed: Feb. 27, 2001

(65) Prior Publication Data

US 2001/0018107 A1 Aug. 30, 2001

(51) Int. Cl.[7] .............................. B05D 5/12; B05D 3/06; B32B 3/02
(52) U.S. Cl. .................. 427/130; 427/131; 427/502
(58) Field of Search .................. 204/192.2; 427/502, 427/128, 548, 130, 131; 29/603.08, 603.13, 603.14; 369/13.02, 13.05, 13.42, 13.47

(56) References Cited

U.S. PATENT DOCUMENTS

| | | | |
|---|---|---|---|
| 5,353,266 A | * 10/1994 | Fujii | 369/13.52 |
| 5,691,963 A | * 11/1997 | Hirokane et al. | 369/13.44 |
| 5,747,136 A | * 5/1998 | Shono et al. | 428/64.3 |
| 6,027,825 A | 2/2000 | Shiratori et al. | 428/694 ML |

FOREIGN PATENT DOCUMENTS

| | | |
|---|---|---|
| JP | 6-290496 | 10/1994 |
| JP | 11-126385 | 5/1999 |
| JP | 11-213375 | 8/1999 |

OTHER PUBLICATIONS

Translations of JP 11–126385 (5/99) and JP 11–213375 (8/99).

* cited by examiner

*Primary Examiner*—Gregg Cantelmo
(74) *Attorney, Agent, or Firm*—Fitzpatrick, Cella, Harper & Scinto

(57) ABSTRACT

A method for manufacturing a magnetic domain wall displacement type magneto-optical medium includes forming a magnetic layer on a substrate and forming sectioning regions in which perpendicular magnetic anisotropy of the magnetic layer is reduced, and a plurality of belt-shaped recording tracks are sandwiched by the sectioning regions and are magnetically separated from each other by irradiating the magnetic layer on the substrate with a light beam or a charged particle beam of a wavelength of not more than 550 nm and scanning the light on the substrate in parallel and at a same interval and a magnetic domain wall displacement type magneto-optical medium.

8 Claims, 6 Drawing Sheets

MAGNETIC DOMAIN WALL DISPLACEMENT TYPE MAGNETO-OPTICAL MEDIUM AND METHOD FOR MANUFACTURING THE SAME

BACKGROUND OF THE INVENTION

1. Field of the Invention

The present invention relates to a magnetic recording medium, in particular to a photo-magnetic recording medium that can reproduce information signals with magnetic domain wall displacement reproducing system and a method for manufacturing the medium.

2. Related Background Art

Various methods to reproduce information signals stored in magnetic storing media are conventionally known. In particular, a magnetic wall displacement reproducing system that the present applicant hereof proposed in Japanese Patent Application Laid-Open No. 6-290496 is to enable information signals with high resolution capability by using displacement phenomena of the magnetic domain wall. That is, using magneto-optical medium in which information signals are formed by the magnetic domain wall on a belt-shaped recording tracks, heating the recording tracks with irradiation of the reproducing light beam to form a movable region without the magnetic domain wall being restrained and as a result driving force by inclination of temperature is operated onto the magnetic domain wall to move it at high speed, and detecting that movement, reproduction of the information signals is implemented.

FIGS. 6A and 6B are partially enlarged views of configuration of a conventional magneto-optical medium 31 used in such magnetic domain wall displacement reproducing system. FIG. 6A is a longitudinal section while FIG. 6B is a plan view. In the figures, magneto-optical medium 31 is comprised of a substrate 32 which is made of transparent resin material such as polycarbonate and configured so as to have belt-shaped portions so that grooves G and lands L are alternately formed in parallel, a magnetic layer 33 formed on the substrate 32 and comprised of a magnetic material, and a protection coat 34 comprised of ultraviolet-curing resin. The magnetic layer 33 provided on land L comprises a belt-shaped recording track RT on which information signals are recorded. The magnetic layer 33 is formed by laminating three layers made of magnetic materials, for example, transition metals such as Tb, Gd and Dy, that is, a displacement layer 33a, a switching layer 33b, and a memory layer 33c. Here, the displacement layer 33a is a perpendicular magnetization film having magnetic coercivity smaller than that of the memory layer 33c and a domain wall mobility larger than that of the memory layer, the switching layer 33b is a film of a magnetic material having curie temperature lower than that of the displacement layer 33a and the memory layer 33c, and the memory layer 33c is a perpendicular magnetization film.

In addition, the magnetic layer 33 formed on a bottom surface and a side surface of a groove G is a sectioning region S in which the perpendicular magnetic anisotropy has been lowered (hatched-portions in FIGS. 6A and 6B). The recording track RT and the sectioning regions S at the both sides of the recording track do not undergo magnetic coupling or do undergo magnetic coupling to an extremely small extent. Such sectioning regions S are formed by being heated with a highly powered laser beam radiation to the grooves, or by a method such as dry etching.

When information signals are recorded onto the recording tracks RT of such magneto-optical medium 31, with the sectioning regions S having been provided in the both sides of the recording tracks RT, the magnetic domain wall, which is a recorded domain, is formed so as to span both ends of the recording track RT without being closed. Accordingly, irradiation of the reproducing light beam makes the magnetic domain wall displace easily, whereby magnetic domain wall displacement reproduction is made to be possible.

In the above described magneto-optical medium, the information signals are recorded only in the recording tracks RT, and the information signals cannot be recorded in the sectioning regions S comprised of magnetic layers 33 with poor magnetic feature. Accordingly, in order to increase the recording density of the information signals, it is effective to narrow the width of the sectioning regions S to increase track density. In conventional ways, in order to form the sectioning regions S, a method of removing a magnetic body by etching and a method of annealing a magnetic body with a laser beam have been employed. However, the etching could not prevent metal contamination from taking place on the magneto-optical medium. In addition, the laser annealing could not narrow the width of the sectioning regions because a method of converging the laser and the conditions for convergence were not optimized.

SUMMARY OF THE INVENTION

An objective of the present invention is to provide a magneto-optical medium of a magnetic domain wall displacement reproducing system, which has a recording density not less than in a conventional method by optimizing irradiation conditions of a laser at the time of forming sectioning regions to narrow width of the sectioning regions, as well as manufacturing method of the medium.

The above described problem is attained by a manufacturing method of magnetic domain wall displacement type magneto-optical medium comprising:

the step (A) of forming a magnetic layer all over a substrate; and the step (B) of forming sectioning regions in which perpendicular magnetic anisotropy of the magnetic layer is reduced and by a plurality of belt-shaped recording tracks which are sandwiched from both sides of the belt-shaped recording track by the sectioning regions and magnetically separated from each other by irradiating the manetic layer on the substrate with a light beam or a charged particle beam of a wavelength of not more than 550 nm in the direction of from the opposite side of the magnetic layer from that facing the substrate toward the substrate and scanning the converged energy beam on the substrate in parallel and at a same interval.

In addition, the above described objective is also attained by magnetic domain wall displacement type magneto-optical medium manufactured with the above described manufacturing method.

Detailed description will be given in examples described later.

BRIEF DESCRIPTION OF THE DRAWINGS

FIG. 1A is a sectional view while FIG. 1B is a plan view;

DESCRIPTION OF THE PREFERRED EMBODIMENTS

Figure 1A:
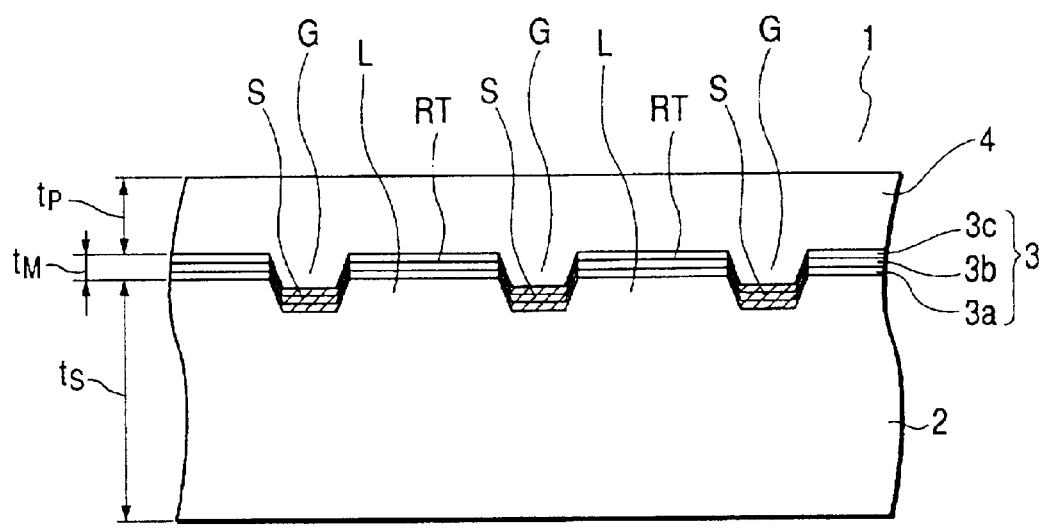
FIGS. 1A and 1B shows a configuration of a magneto-optical medium of the present invention.
Figure 1B:
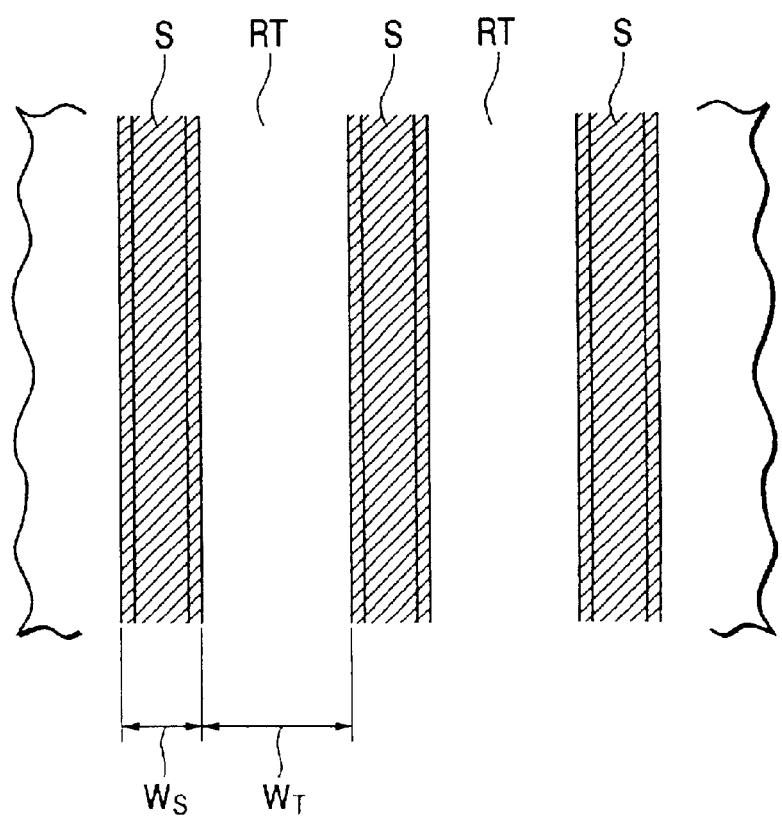

A method to manufacture a magnetic recording media being the present invention will be described as follows. Incidentally, through all the drawings, the same codes denote equivalent portions. FIGS. 1A and 1B are partially enlarged views showing configurations of a magneto-optical medium 1 being a magnetic recording medium manufactured by using the present invention, and FIG. 1A is a longitudinal section while FIG. 1B is a plan view. Here, the magneto-optical medium 1 is formed by a plate-shaped substrate 2, a magnetic layer 3 formed on the substrate 2, and a protection coat 4 formed on the magnetic layer 3.

The substrate 2 is made of a transparent resin material such as polycarbonate, having thickness $t_S$ of 1.2 mm, on the surface thereof belt-shaped grooves G and lands L are formed in parallel.

The magnetic layer 3 is comprised of laminating three layers comprised of magnetic materials, that is, a displacement layer 3a, a switching layer 3b, and a memory layer 3c. Thickness $t_M$ of the magnetic layer 3 is 80 nm. An alloy of rare earth such as, for example, Tb, Gd and Dy, and a transition metal such as Fe and Co is suitably used as magnetic material. The displacement layer 3a is a perpendicular magnetization film having magnetic coercivity smaller than that of the memory layer 3c and magnetic wall movement larger than that of the memory layer 3c, the switching layer 3b is a film of a magnetic material having curie temperature lower than the displacement layer 3a and the memory layer 3c, and the memory layer 3c is a perpendicular magnetization film.

The magnetic layer 3 formed on a land L comprises a belt-shaped recording track RT in which information signals are recorded. In addition, the magnetic layers 3 formed on a bottom surface and a side surface of grooves G at both sides of a recording track RT are a sectioning region S in which the perpendicular magnetic anisotropy thereof has been lowered. The recording tracks RT are magnetically separated each other by a sectioning region S. Incidentally, in FIG. 1B, $W_S$ is width of the sectioning region S while $W_T$ is width of the recording track RT.

The constitution of the magneto-optical medium regarding the present invention is not limited to the above-explained embodiment but may be a structure wherein the magnetic layer 3 formed on the land L functions as a sectioning region S and the magnetic layer formed on the bottom surface of groove G functions as a recording track RT.

The protection coat 4 is a thin film, etc. made of an ultraviolet-curing resin film or a resin material and its thickness $t_P$ is preferably not less than 1 μm. In the case where the protection coat is a hard film made of SiN, $SiO_2$, graphite, and diamond-like carbon, etc., its thickness may be not more than 1 μm.

Next, a manufacturing method of the above described magneto-optical medium 1 will be described. FIGS. 2A, 2B, 2C, 2D, and 2E are partially enlarged views in the respective manufacturing steps for magneto-optical medium 1.

Figure 2A:
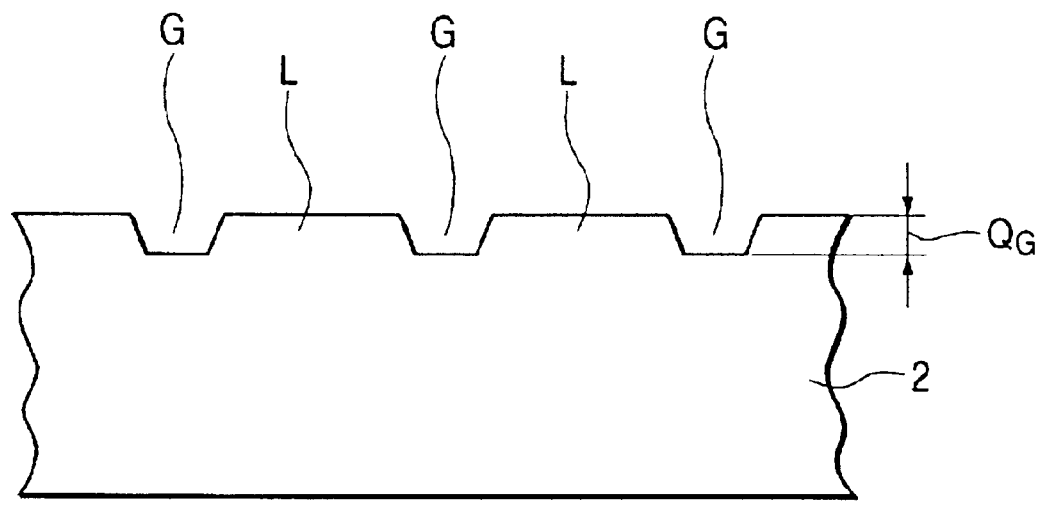
FIGS. 2A, 2B, 2C, 2D, and 2E are drawings showing manufacturing method of the present invention.

At first, a substrate 2 as shown in FIG. 2A is produced. The substrate 2 is formed by injection forming with a resin material such as polycarbonate, and lands L and grooves G are formed in parallel on its surface. The land width $W_T$ is 0.65 μm, the groove width $W_S$ is 0.25 μm, and a depth of groove G is 0.1 μm. In addition, the width $W_S$ of the sectioning region S formed in the groove G is made narrower than the width $W_T$ of the recording track RT.

Incidentally, the depth of the groove G represents height $Q_G$ from the level of the land L to the level of the groove G as shown in FIG. 2A.

Incidentally, recording density of the magneto-optical medium expected from these sizes is 0.9 to 1.3 gigabit/$cm^2$.

Figure 2B:
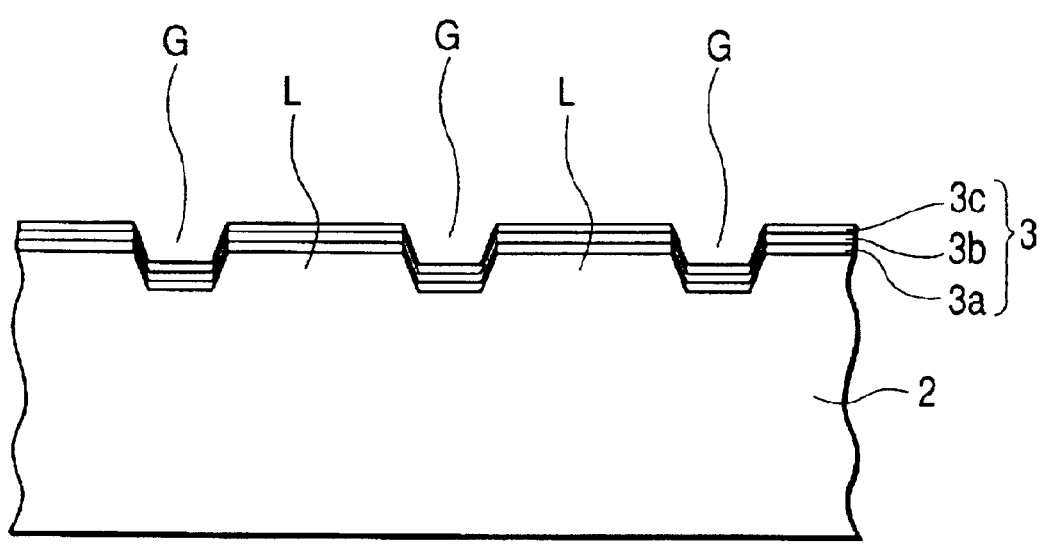

Next, as shown in FIG. 2B, on the surface of the substrate 2 where the lands L and grooves G are formed, displacement layers 3a being a film of a magnetic material, switching layers 3b, and memory layers 3c are sequentially laminated by a method such as sputter filming to form a magnetic layer 3.

Figure 2C:
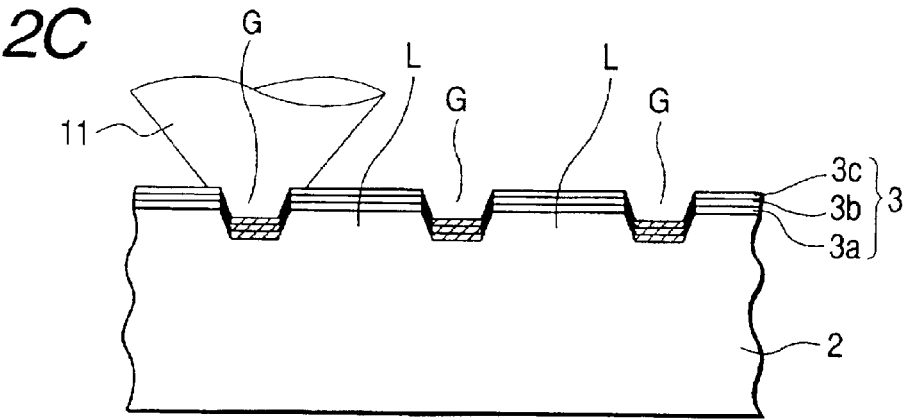

Next, as shown in FIG. 2C, the magnetic layer 3 of the groove G is irradiated in the direction of from the opposite side of the magnetic layer 3 from that facing the substrate 2 toward the substrate 2 so that this energy beam 11 is brought into scanning along the groove G to form the sectioning region S.

There is a difference in height between sectioning region S (groove G) and recording track RT (land L). This structure of the difference in height doubles as an guide for tracking when energy beam 11 scans.

Figure 2D:
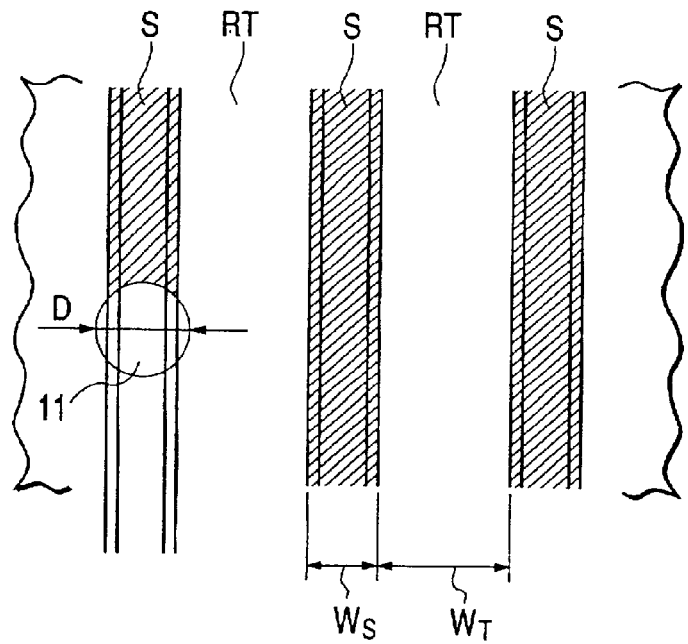

FIG. 2D is a plan view seen from the irradiating direction of the beam of FIG. 2C. It is the portion where irradiation on the hatched portion has already been over, and the perpendicular magnetic anisotropy of the magnetic layer 3 has dropped. The energy beam 11 with the converged diameter D is irradiated to go over the groove G. This is because the sectioning region S has a width of 40 to 80 percent of the converged diameter D of the energy beam 11.

If energy beam 11 should be a light beam with wavelength not more than 550 nm, its converged diameter D can be made to be 0.05 to 0.6 μm. In addition, if the energy beam 11 should be a charged particle beam such as an electron beam and an ion beam, its converged diameter D can be made to be 0.02 to 0.2 μm.

Irradiation of such energy beam 11 heats the magnetic layer 3 formed in the groove G to change the coupling state among atoms configuring the magnetic layer 3 to cause the perpendicular magnetic anisotropy to drop so that the sectioning region S is formed.

In the case of irradiation of ion beam, ions are implanted into the magnetic layer 3 formed in the groove G or atoms configuring the magnetic layer 3 undergo sputtering so as to change the composition of the magnetic layer 2 or the coupling state among atoms and to cause the perpendicular magnetic anisotropy to drop so that the sectioning region S is formed.

Although it was not illustrated, if a dielectric layer and/or a heat-radiating layer be provided on the magnetic layer 3, filming will be implemented at this stage.

Figure 2E:
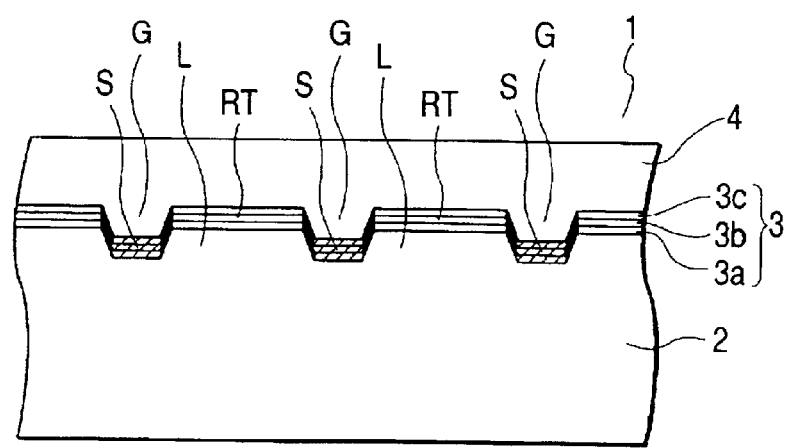

Next, as shown in FIG. 2E, an ultraviolet-curing resin material is applied onto the magnetic layer 3 to radiate a ultraviolet light to make the resin material cure, or to stick a thin sheet made of a resin material onto the magnetic layer 3 to form a protection coat 4 so that the magneto-optical medium 1 is completed.

Incidentally, in order to form the sectioning region S to have sufficiently narrow width $W_S$, the converged diameter D of the energy beam 11 needs to be made small. In particular, a method to make the converged diameter D small in the case where a light beam is used as the energy beam 11 will be described below.

Figure 3:
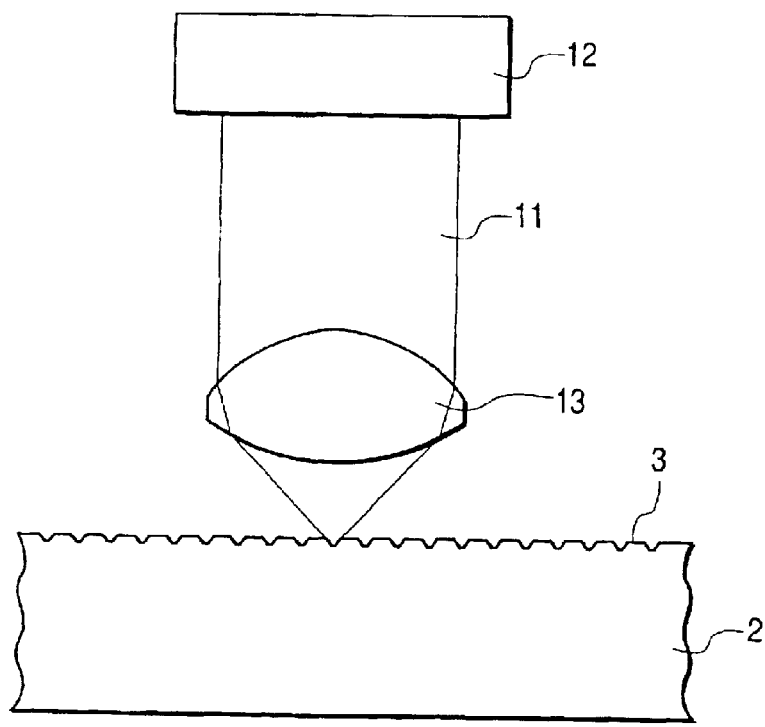
FIG. 3 is a drawing showing radiation method of an energy beam in the manufacturing method of the present invention.

FIG. 3 shows an optical system wherein a light beam is the energy beam 11 getting converged and irradiated onto the magnetic layer 3. In the drawing, a reference numeral 12 denotes a light source generating the light beam, and a light beam 11 generated from the 12 and going in parallel is converged onto the magnetic layer 3 with a condenser 13. Here, with the wavelength of the light beam being λ, the numerical aperture of the condenser 13 being NA, the converged diameter D of the light beam is proportional to λ/NA, and therefore, as the wavelength λ gets shorter and the numerical aperture NA gets larger, the converged diameter D of the light beam can be made smaller. The numerical aperture of the condenser lens is apt to be not more than 0.6 in general, and in order to make the width $W_S$ of the sectioning region S not more than 0.48 μm, the wavelength λ of the light beam should be preferably not more than 550 nm. Practically, as the light source 12, a semiconductor laser, an He-Cd laser (442 nm), an Ar ion laser (515 or 488 or 458 nm), a Kr ion laser (413 nm), etc. can be used. Or higher harmonic of secondary or more intensive level such as the semiconductor laser and a YAG laser can be used to obtain a light beam with a shorter wavelength. In addition, the condenser 13 with NA≧0.65 is desirably used.

For example, the wavelength of the light beam being 400 nm, the NA of the condenser 13 being 0.85, the converged diameter D of the light beam can be made to be 0.42 μm. In addition, the width $W_S$ of the sectioning region S to be formed at this time will be 0.25 μm equivalent to 60 percent of the converged diameter D.

Figure 4:
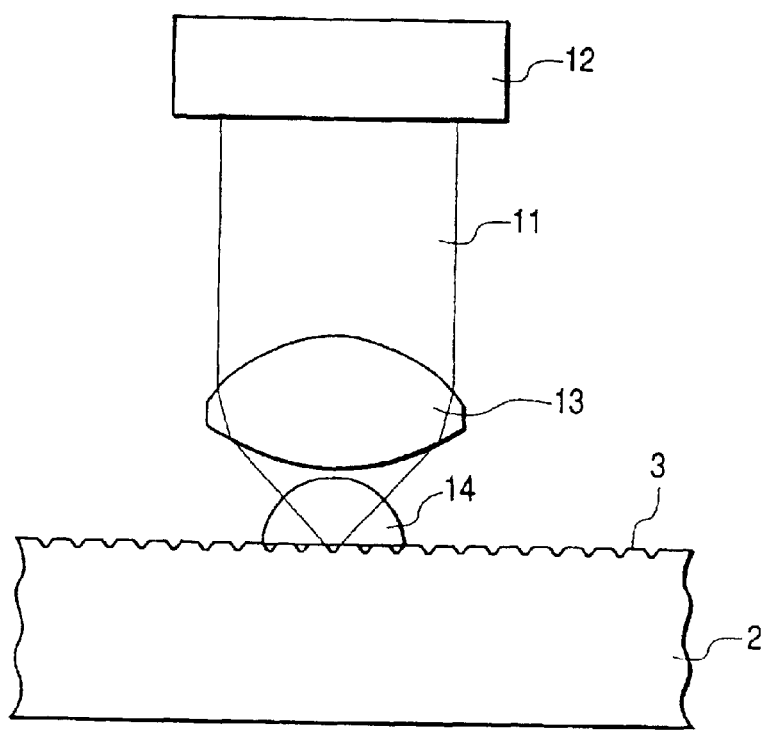
FIG. 4 is a drawing showing radiation method of an energy beam in the manufacturing method of the present invention.

As shown in FIG. 4, if an adjacent field light generating element 14, SIL (Solid Immersion Lens) such as a hemispheric lens made of a material with a high refractive index, and micro aperture element are disposed in the vicinity of the surface of the substrate 2, and an adjacent field light generated by the adjacent field light generating element 14 is irradiated as light beam, its converged diameter D can be made much smaller, for example, to around 0.05 to 0.2 μm. Since the sectioning region width $W_S$ is 40 to 80 percent of the converged diameter D, adoption of the adjacent field light will enable the sectioning region to be made not more than 0.1 μm as well.

Incidentally, since the condenser 13 has shorter focal distance as its numerical aperture NA is made larger, it must be disposed nearby the magnetic layer 3. In addition, in order to irradiate the adjacent field light onto the magnetic layer 3 as a light beam, the adjacent field light generating element 14 must be disposed so that the interval with the magnetic layer 3 is made not more than 0.1 μm.

Supposing the light beam is irradiated from the rear surface side of the substrate where no magnetic layers 3 exist, thickness of the substrate 2 (approximately around 0.6 to 1.2 mm) does not enable the condenser 13 or the adjacent field light generating element 14 to be placed sufficiently close to the magnetic layer 3, as well as divergence in optical features of the substrate gets influential. Accordingly, irradiation of the light beam must be implemented from the front surface side where the magnetic layer 3 has been formed, i.e. in the direction of from the opposite side of the manetic layer from that facing the substrate toward the substrate.

In addition, if subject to formation of the protection coat 4 on the magnetic layer 3 the light beam is irradiated through the protection coat 4, thickness (1 to 30 μm) of the protection coat 4 or unevenness in its optical features causes intensiveness of the light beam to be converged onto the magnetic layer 3 to vary. In addition, with the protection coat 4 being thick, the condenser 13 or the adjacent field light generating element 14 cannot be disposed sufficiently nearby the magnetic layer 3. Accordingly, the formation of the sectioning region S by way of irradiation of a light beam is desirably implemented prior to formation of the protection coat 4 onto the magnetic layer 3. In particular, in case of thickness of the protection coat 4 being not less than 1 μm, the formation of the sectioning region S by way of irradiation of a light beam is desirably implemented prior to formation of the protection coat 4 onto the magnetic layer 3.

In addition, in the case where charged particle beam such as an electron beam and an ion beam is used as the energy beam 11, the manetic layer 3 is desirably irradiated with the charged particle beam in the direction of from the opposite side of the magnetic layer from that facing the substrate toward the substrate so as not to shield the charged particle beam by the substrate 2 or the protection coat 4 prior to formation of the protection coat 4 onto the magnetic layer 3 to form the sectioning region S.

In addition, also in the case where the heat-radiating layer is provided on the magnetic layer 3, in order that the light beam or the charged particle beam being the energy beam 11 might not be shielded by the heat-radiating layer, the energy beam 11 is desirably irradiated in the direction of from the opposite side of the magnetic layer from that facing the substrate toward the substrate prior to formation of the heat-radiating layer onto the magnetic layer 3 to form the sectioning region S.

In addition, also in the case where a dielectric layer is provided on the magnetic layer 3, due to the similar reasons, the energy beam 11 is desirably irradiated in the direction of from the opposite side of the magnetic layer from that facing the substrate toward the substrate prior to formation of the dielectric layer onto the magnetic layer 3 to form the sectioning region S.

However, in the case where the dielectric layer is made of a material which can be easily penetrated by the energy beam 11 and its thickness is not more than 1 μm, attenuation of the energy beam due to the dielectric layer can be restrained. Therefore, the sectioning region S may be formed after protecting the magnetic layer 3 with the dielectric layer and then irradiating the energy beam 11 onto the magnetic layer 3 through the dielectric layer in this case.

Combination between the dielectric layer and the energy beam to which this technique is applicable can be exemplified by the case where SiN and $Si_3N_4$ are used as materials for the dielectric layer, and the film thickness of the dielectric layer is made not more than 1 μm, and the light beam with its wavelength being 400 to 550 nm is used.

As for a scanning method of the energy beam 11, the converging position of the energy beam 11 is detected by the reflected light from the substrate 2 so that, based on that detected signals, tracking control and/or focusing control for the energy beam 11 to be irradiated exactly at the position where the sectioning region S should be formed can be implemented for scanning. Or together with the energy beam 11 the light beam for controlling, etc. is irradiated so that, based on detected signals by that, tracking control and/or focusing control may be implemented on the energy beam 11 for scanning.

Figure 5A:
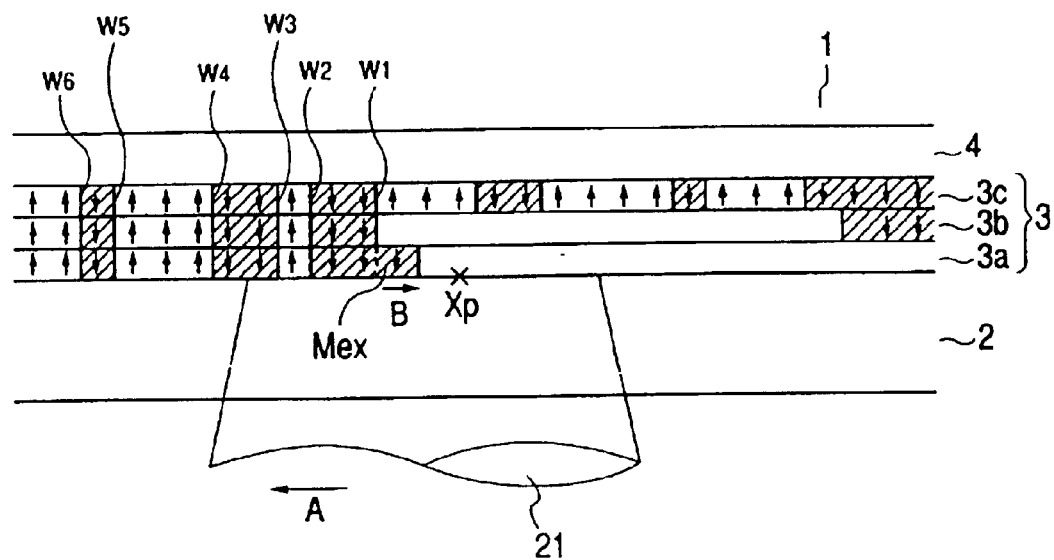
FIGS. 5A and 5B are drawings describing a reproducing method of information signals according to magnetic domain wall displacement reproduction system.
Figure 5B:
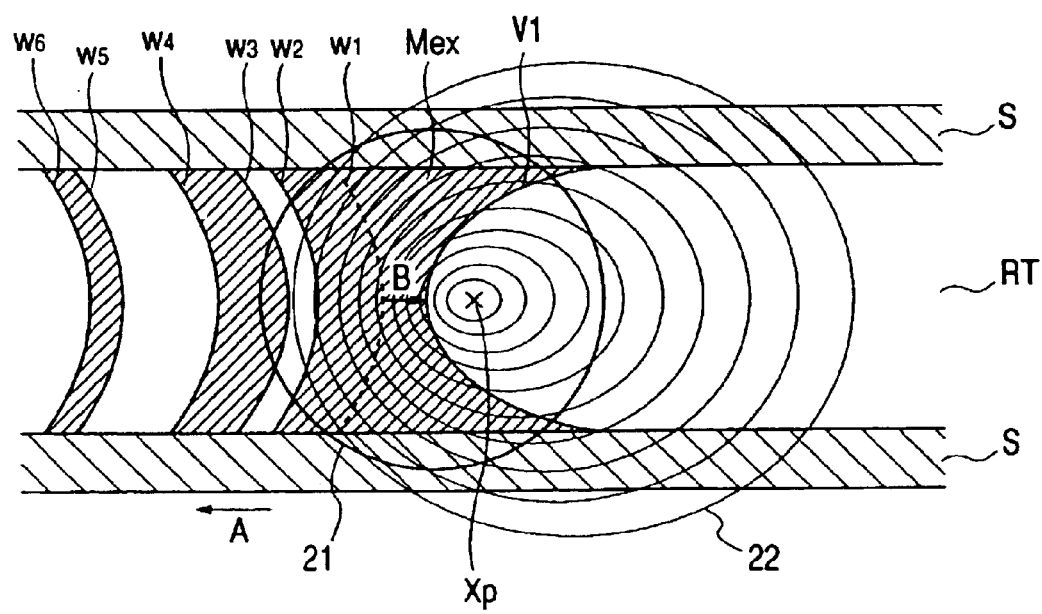
Figure 6A:
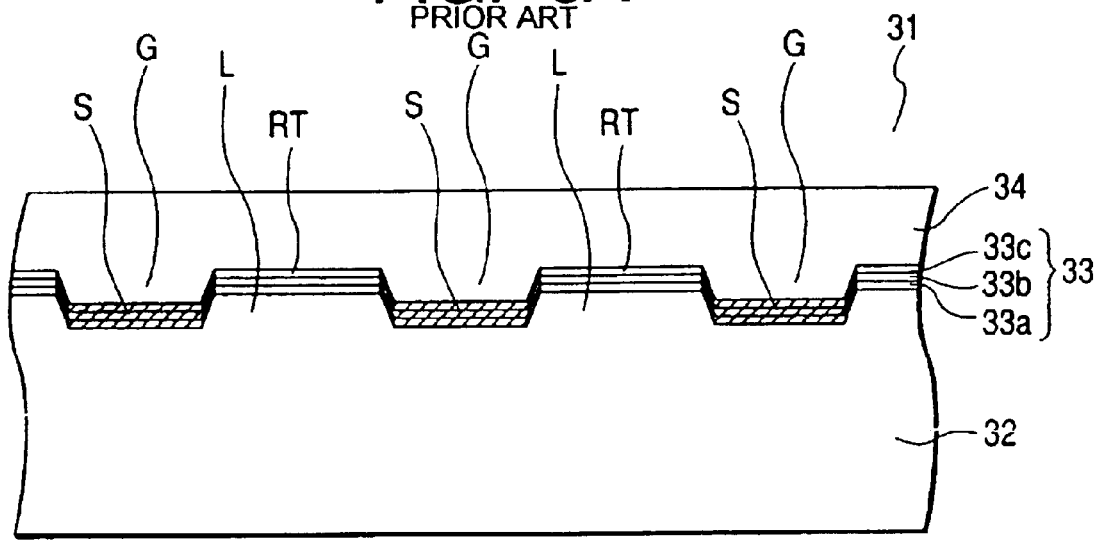
FIGS. 6A and 6B are drawings showing a configuration of conventional magneto-optical medium.
Figure 6B:
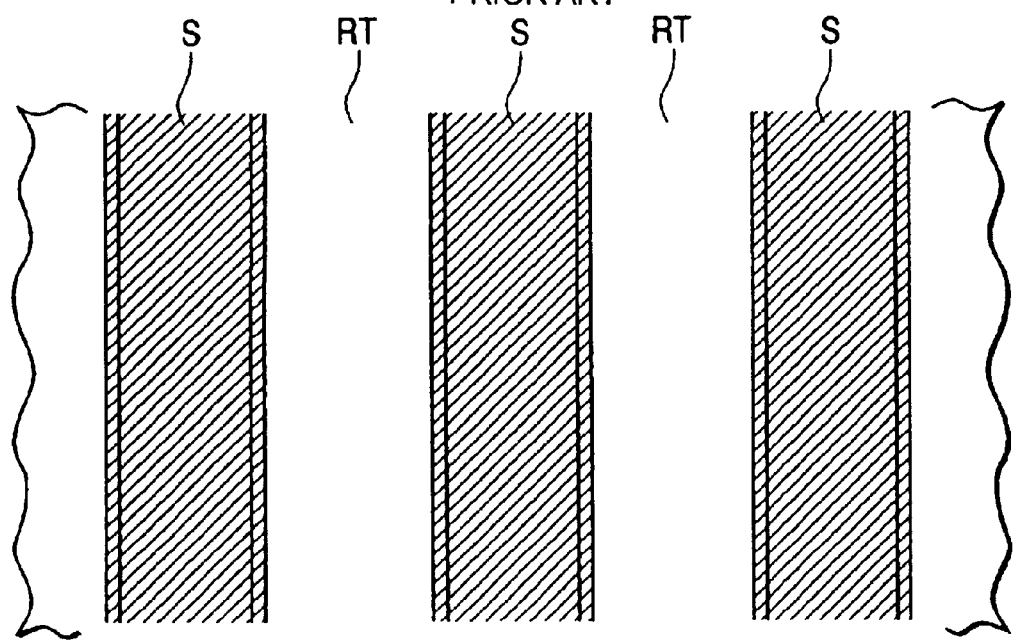

Next, a method to reproduce information signals from the above described magneto-optical medium 1 with a reproducing apparatus will be described. The reproducing apparatus comprises driving means for an optical head and the magneto-optical medium 1. FIGS. 5A and 5B are partially enlarged views of the magneto-optical medium 1 showing a reproducing system of information signals by way of displacement layer system, and FIG. 5A is a cross-sectional view cut in the direction in parallel along the recording track while FIG. 5B is a plan view taken from the direction of a lower surface. On the magnetic layer 3 configuring the recording tracks RT, magnetization regions having magnetization in the upward direction and in the downward direction are arranged alternately to be formed, and in the boundary portion between the magnetization region and the preceding and following magnetization region, magnetic domain walls W1, W2, . . . , and W6 are formed. Here, at the both side of the recording tracks RT, sectioning regions S in which the perpendicular magnetic anisotropy has been lowered is formed and therefore the magnetic domain walls W1, W2, . . . and, W6 are formed to span the both ends of the recording track RT without closing.

At the time when information signals are reproduced, the optical head implements irradiation by converging a low powered light beam for reproducing 21 to a recording track RT through a substrate 2. At the same time, (not shown) driving means drive the magneto-optical medium 1, and thereby the light beam for reproducing 21 scans the recording track RT toward the direction indicated by an arrow A. Temperature of a magnetic layer 3 increases with irradiation of the light beam for reproducing 21, and in the periphery of the irradiation region of the light beam for reproducing 21 a thermal distribution as shown by an isothermal line 22 in the drawing is formed. In the figures, a reference numeral 22 denotes an isothermal line of a temperature Ts approximately equal to the curie temperature of the switching layer 3b and as the isothermal line is located more internally, the represented temperature gets higher while a reference character Xp denotes a peak position of temperature. As described later, in the displacement layer 3a of the recording track RT, the magnetic domain wall is movable only in a region of temperature not less than Ts, that is, a region surrounded by the isothermal line 22, and in the other region movement of a magnetic domain wall is impossible.

In a position sufficiently remote from the irradiation region of the light beam for reproducing 21, temperature of the magnetic layer 3 is low and in this position, the displacement layer 3a, the switching layer 3b, and the memory layer 3c have mutually undergone exchange coupling, and magnetization as well as the magnetic domain wall formed in the magnetic storing layer 3c have been transfer-formed in the switching layer 3b and the displacement layer 3a as well. In addition, since the temperature distribution is approximately unanimous, a driving power to move the magnetic domain wall transcribed into the displacement layer 3a does not act and therefore the magnetic domain wall remain fixed. However, in the location closer to the irradiation region of the light beam for reproducing 21, the temperature of the magnetic layer 3 increases, and subject to passing the forefront portion of the isothermal line 22, the temperature of the switching layer 3b reaches not less than Ts to cancel magnetization. Thus, since exchange coupling among the displacement layer 3a, the switching layer 3b, and the memory layer 3c is cut in the region with temperature surrounded by the isothermal line 22 higher than Ts and magnetic coupling between the displacement layer 3a and the recording track RT and the sectioning regions S at its both sides are not brought into magnetic coupling or the magnetic coupling is extremely small, the magnetic domain wall will become movable in the displacement layer 3a without being restricted. However, since the surrounding temperature is inclined, the driving power will act on the magnetic domain wall in the direction of higher temperature and of lower energy. Thus, the magnetic domain wall (V1 in FIGS. 5A and 5B) which has passed through the forefront portion of the isothermal line 22 moves rapidly toward a position Xp whose temperature reaches the peak as shown in the arrow B in the displacement layer 3a. Incidentally, in the drawing, the magnetic domain wall V1 prior to movement is indicated by a broken line. Accompanied by movements of this magnetic domain wall, a magnetization region Mex having magnetization in one direction (the downward direction in the drawn example) is extended and formed. Incidentally, the memory layer 3c is made of a material having a small degree of domain wall displacement, and therefore the magnetic domain wall does not move in the memory layer 3c.

Thus, the magnetic domain walls W1, W2, . . . and, W6 move toward the position Xp every time when they pass the forefront portion of the isothermal line 22 subsequently, and each time the magnetization region eye Mex which has magnetization upward and downward and extended is formed alternately. A polarization direction of the reflecting light of the readout light beam 21 from this magnetization region Mex rotates corresponding with direction of magnetization of the magnetization region Mex due to magneto-optics effect (Kerr effect). Rotation of such polarization direction is detected with an optical head. Since these detected signals include changes in signals corresponding with movement of the magnetic domain wall, with the magnetic domain wall as information signal mark being formed at a position corresponding with the information signals to be stored, information signals can be reproduced from timing of changes in signals.

Examples of the present invention will be described below.

EXAMPLE 1

Manufacturing method of a magneto-optical medium of the present invention will be described.

Polycarbonate undergoes injection forming to give rise to a substrate 2. Incidentally, at the time of injection, the lands L (width $W_T$: 0.53 $\mu$m) and the grooves G (width $W_S$: 0.33 $\mu$m and depth: 0.07 $\mu$m are formed. In this example, the lands L will become the recording tracks RT and the grooves G will become the sectioning regions S.

The recording density expected from these land widths and groove widths is 1 to 1.4 G bit/cm$^2$.

Hereafter, the substrate is put in the sputtering filming apparatus so that the magnetic layer 3 is formed. Incidentally, since filming of the magnetic layer 3 must be implemented seriously without breaking the state of vacuum, the sputtering filming apparatus must have at least three kinds of targets.

First but not least, a displacement layer 3a of 30 nm thickness is formed in contact with the substrate. Composition of the magnetic displacement layer is GdFeCo. Continuously, a switching layer 3b of 10 nm thickness composed by DyFe is filmed. Lastly, a memory layer 3c of 40 nm thickness composed by TbFeCo is filmed and film-manufacturing of the magnetic layer is completed.

This will form the magnetic layer all over the substrate 2. Since the inclined portion of the grooves G is inclined against the target surface, the magnetic layer is thin with 20 nm in thickness, but in the flat portion of the lands L and the grooves G the magnetic layer is constant with 40 nm in thickness.

The substrate in which the magnetic layer is formed is taken out in the atmosphere of the inert gas ($N_2$) and introduced into a light radiation apparatus. In this example, taking it into consideration that the sectioning region width $W_S$ is 0.33 μm, an Ar ion laser light of wavelength of 488 nm and a condenser with the numerical aperture NA of 0.8 were used.

A converged diameter D of the light beam obtainable from these condition of the optical system is 0.55 μm. The sectioning region width $W_S$ corresponds with 60 percent of this converged diameter D.

Incidentally, the light beam underwent tracking control and focusing control by detecting the refractive light from the substrate 2 to determine the converging position of the light beam and was caused to scan the grooves G.

As for the sectioning region where the converged light beam is irradiated, the temperature reaches 450° C. which is higher than the curie point of the magnetic layer as well as the movement start temperature of the magnetic domain wall, resulting in changes in the structure as well as the composition of the magnetic layer and disappearance of the perpendicular magnetic anisotropy. In particular, in the bottom portion where film thickness of the magnetic layer is thick, the perpendicular magnetic anisotropy could remain to a tiny extent, but in the side wall where film thickness of the magnetic layer is thin, the perpendicular magnetic anisotropy disappears so that respective recording tracks RT will be separated magnetically each other.

Thus, when formation of the sectioning regions is over, filming of the protection coat 4 is followed continuously. In this example, after the ultraviolet-curing resin had been applied by the spin coat method to provide with approximately thickness of 10 μm, an ultraviolet beam was radiated all over the surface to get hardened.

As described above, the magneto-optical medium of the present invention is given.

Since the recording density of the magneto-optical medium in a magnetic domain wall displacement reproducing system of a conventional method is 0.8 Gbit/$cm^2$, the recording density in the present invention was successfully heightened by approximately 1.25 to 1.75 times.

EXAMPLE 2

Except that, at the time of production of a substrate 2, width of the lands L was set at 0.53 μm, and width of the grooves G was set at 0.073 μm and depth thereof was set at 0.06 μm, production of the substrate as well as filming of the magnetic body was implemented as in the example 1.

Also in this example, the lands L were treated as the recording tracks RT and the grooves G were treated as the sectioning regions S. The recording density expected from these land widths and groove widths is 1.4 to 1.9 G bit/$cm^2$.

In this example, in order to shorten the sectioning region width $W_S$ to 0.073 μm which is shorter than that in the example 1, an ultraviolet solid laser light with wavelength of 266 nm as a light beam, a condenser with the numerical aperture NA of 0.8 and SIL being an adjacent field light generating element were used.

A converged diameter D of the light beam obtainable from these condition of the optical system is 0.13 μm. The sectioning region width $W_S$ corresponds with 56 percent of this converged diameter D.

Here, since the distance that causes the adjacent field light to be active is extremely small, the SIL was fixed at 0.035 μm above the recording track surface of the substrate.

Incidentally, in this example, in order that the light beam may scan the grooves G exactly, tracking control and focusing control, in which another light being concurrently irradiated onto the lands L detecting the refractive light, and with the refractive light thereof, position and depth of the light beam were determined, were adopted.

Thus, when formation of the sectioning regions is over, formation of the protection coat 4 is followed continuously. In the present invention, a polyethylene terephthalate sheet (with thickness of 10 μm) containing particles of $TiO_2$ was stuck together with the substrate 2 with an adhesive material.

As described above, the magneto-optical medium of the present invention is given.

Since the recording density of the magneto-optical medium in a magnetic domain wall displacement reproducing system of a conventional method is 0.8 Gbit/$cm^2$, in this example, the recording density by approximately 1.75 to 2.38 times was successfully obtained.

EXAMPLE 3

At the time of production of a substrate 2, width of the lands L was set at 0.19 μm, and width of the grooves G was set at 0.53 μm, and production of the substrate as well as filming of the magnetic substance was implemented as in the example 1. However, in this example, opposite against the examples 1 and 2, the grooves G are treated as the recording tracks RT and the lands L are treated as the sectioning regions S. The recording density expected from these land widths and groove widths is 1.2 to 1.6 G bit/$cm^2$.

In addition, in order to make the sectioning region width $W_S$ to 0.19 μm, a semiconductor laser light with wavelength of 410 nm and a condenser with the numerical aperture NA of 0.9 was used. A converged diameter of the light beam obtainable from these condition of the optical system is 0.41 μm. The width $W_S$ of the sectioning regions S corresponds with 46 percent of this converged diameter D.

Incidentally, the light beam underwent tracking control and focusing control by detecting the refractive light from the substrate 2 to determine the converging position of the light beam and was caused to scan the lands L so that the sectioning regions S were formed. Moreover, as in the example 1, the protection coat was formed.

Since the recording density of the magneto-optical medium in a magnetic domain wall displacement reproducing system of a conventional method is 0.8 Gbit/$cm^2$, in this example, the recording density by approximately 1.5 to 2.0 times was successfully obtained.

What is claimed is:

1. A method for manufacturing a magneto-optical medium in which a domain wall of a recording magnetic domain is displaced in accordance with a temperature distribution in the magneto-optical medium comprising, in order:

(a) the step of forming a magnetic layer on a substrate;

(b) the step of forming on the magnetic layer a dielectric layer;

(c) the step of forming sectioning regions in which perpendicular magnetic anisotropy of the magnetic layer is reduced by irradiating the magnetic layer on the substrate with a light beam of a wavelength of not more than 550 nm or a charged particle beam through the dielectric layer from a side opposite a side of the magnetic layer facing the substrate surface and scanning the light beam or the charged particle beam on the substrate in parallel and at a same interval, thereby magnetically separating from each other a plurality of recording tracks sandwiched between said sectioning regions; and (d) the step of forming on the dielectric layer a protection coat.

2. The method according to claim 1, wherein a ratio ($W_S/W_T$) of a width $W_S$ of said sectioning regions toward a width $W_T$ of recording tracks is $W_S/W_T<1$.

3. The method according to claim 2, wherein width $W_S$ of said sectioning regions is 0.01 to 0.48 μm.

4. The method according to claim 1, wherein width $W_S$ of said sectioning regions is 40 to 80 percent of a converged diameter D of said light beam.

5. The method according to claim 1, wherein there is a difference in height between said sectioning regions and the recording tracks, and the difference in height also works as guides for tracking at a time when said light beam scans.

6. The method according to claim 1, wherein in said step of forming sectioning regions, said light beam is converged with a condenser of a numerical aperture $NA \geqq 0.65$.

7. The method according to claim 6, wherein a converged diameter D of said light beam is 0.05 to 0.6 μm.

8. The method according to claim 1, wherein said magnetic layer comprises at least a displacement layer in which magnetic domain walls move, a memory layer for storing information and a switching layer having a Curie temperature lower than those of the displacement layer and switching layer.

* * * * *